United States Patent [19]

Binsack

[11] 3,839,283

[45] Oct. 1, 1974

[54] NOVEL POLYBEN Z-1,3-OXAZIN-(2,4)-DIONES AND A PROCESS FOR THEIR PRODUCTION

[75] Inventor: Rudolf Binsack, Krefeld, Germany

[73] Assignee: Bayer Aktiengesellschaft, Leverkusen, Germany

[22] Filed: June 29, 1973

[21] Appl. No.: 374,876

[30] Foreign Application Priority Data
July 1, 1972    Germany............................ 2232463

[52] U.S. Cl......... 260/47 CP, 260/30.2, 260/30.8 R, 260/30.8 DS, 260/32.6 N, 260/33.4 P, 260/49, 260/78 A, 260/78 TF, 260/471 C
[51] Int. Cl.............................................. C08g 33/02
[58] Field of Search..... 260/47 CP, 49, 78 TF, 78 A

[56] References Cited

UNITED STATES PATENTS

| | | | |
|---|---|---|---|
| 2,847,461 | 8/1958 | Lecher et al.......................... | 260/519 |
| 3,244,675 | 4/1966 | Angelo................................ | 260/77.5 |
| 3,379,686 | 4/1968 | Bottenbruch et al................. | 260/47 |
| 3,424,728 | 1/1969 | Nakanishi et al................... | 260/77.5 |
| 3,461,096 | 8/1969 | Rabilloud et al. .................... | 260/47 |
| 3,553,304 | 1/1971 | Reese et al. ......................... | 264/210 |
| 3,637,594 | 1/1972 | Gallus et al.......................... | 260/47 |

*Primary Examiner*—Lester L. Lee
*Attorney, Agent, or Firm*—Plumley & Tyner

[57]    ABSTRACT

The present invention relates to novel polybenz-1,3-oxazin-(2,4)-diones and their production from anhydrous N-(aroxy-carbonyl)-amino-o-hydroxy aryl carboxylic acid esters.

10 Claims, No Drawings

NOVEL POLYBENZ-1,3-OXAZIN-(2,4)-DIONES AND A PROCESS FOR THEIR PRODUCTION

According to German Offenlegungsschrift No. 1,595,579, polybenz-1,3-oxazin-(2,4)-diones can be obtained by reacting bis-o-hydroxy aryl carboxylic acid esters with diisocyanates, i.e., for example

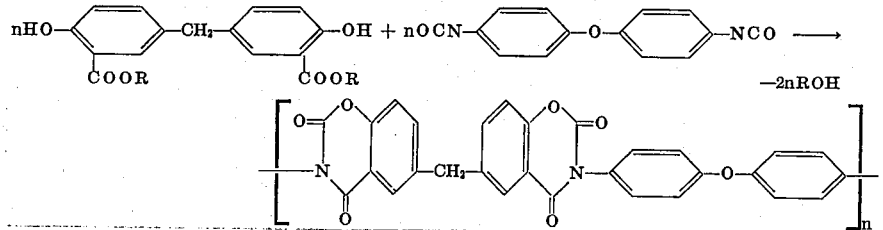

This process is attended by the following disadvantages:

The diisocyanate used has to be extremely pure to guarantee high molecular weight products. Diisocyanates tend to age on storage, even at room temperature, forming dimeric, trimeric and other polymeric compounds which generally interfere with the production of uniform polymers. In most cases, even stabilised diisocyanates are not completely stable in storage, although they do age more slowly. Another complicating factor is that stabilisers can interfere with the polycondensation reaction. In order, therefore, to obtain high molecular weight polybenzoxazin diones without any faults, the diisocyanates have to be used in freshly distilled form. However, it is extremely difficult and, in some cases, totally impossible to distil diisocyanates of high molecular weight.

Therefore it is preferred for the production of high molecular weight polymer, that the reacting functions are present in the same molecule (AB-monomer).

However, it is not possible by the process mentioned above to obtain polybenz-1,3-oxazin-(2,4)-diones from molecules of the kind which have both the isocyanate and the salicyclic acid function (AB-monomer) in the same compound.

Surprisingly it has now been found that by polycondensing anhydrous N-(aroxycarbonyl)-amino-o-hydroxy aryl carboxylic acid esters (AB-monomers) polybenz-1,3-oxazin-diones are obtained in the smooth reaction.

Accordingly the present invention relates to a process for the production of polybenz-1,3-oxazin-(2,4)-diones by polycondensing AB-monomers at temperatures of from 20° to 200°C, wherein said AB-monomers are anhydrous N-(aroxycarbonyl)-amino-o-hydroxy aryl carboxylic acid esters corresponding to the general formula

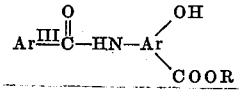

in which
$Ar'''$ represents a one-linkage $C_6 - C_{10}$ aromatic radical;
R represents a $C_1$ to $C_4$-alkyl radical, a $C_7$ to $C_{10}$ aralkyl radical or $Ar'''$; and
Ar represents

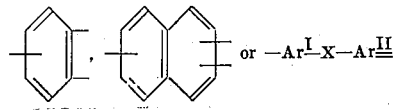

and the two-linkages which attach the oxygen or carbonyl function, are in the o-position to one another,
$Ar'$ represents a bivalent $C_6 - C_{10}$ aromatic radical;
$Ar''$ represents a trivalent $C_6 - C_{10}$ aromatic radical; and X represents a monovalent radical, —O—, —S—, —SO$_2$—, —CH$_2$— or —CO—, Another object of the present invention are the new polybenz-1,3-oxazin-(2,4)-diones with a recurring structural unit corresponding to the following general formula

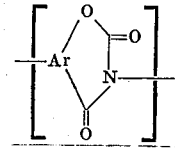

in which Ar is as just defined, and which are obtained by the condensation process described above.

The molecular weight of these new polymers ranges from 5,000 to 100,000. The polymer chain consists of from 20 to 600 above described units on an average.

N-(aroxycarbonyl)-(o, p or m)amino-o-hydroxy aryl carboxylic acid esters suitable for use in the production of polybenz-1,3-oxazin-(2,4)-diones in accordance with the invention can readily be obtained by reacting corresponding (o, p or m)-amino-o-hydroxy aryl carboxylic acid esters with chlorocarbonic acid aryl esters, such as chlorocarbonic acid phenyl ester and chlorocarbonic acid naphthyl ester. Suitable N-(aroxycarbonyl)-amino-o-hydroxy aryl carboxylic acid esters can be derived for example from the following amino-o-hydroxy aryl carboxylic acids:

4-aminosalicylic acid, 5-aminosalicylic acid, 4-(4-aminophenoxy)-salicylic acid, 5-(4-aminophenoxy)-salicylic acid, 4-(2-amino-4-chlorophenoxy)-salicylic acid, 5-(2-amino-4-chlorophenoxy)-salicylic acid, 5-(4-amino-2-chloro-phenoxy)-salicylic acid, 7-amino-3-hydroxy-2-naphthoic acid, 5-(4-aminophenyl)-salicylic acid, 5-(4-aminophenyl carbonyl)-salicylic acid, 5-(4-aminophenyl methylene)-salicylic acid, 5-(4-aminophenyl-thio)-salicylic acid, 5-(4-aminophenyl-sulphone)-salicylic acid or mixtures thereof.

Among these compounds the monomers which are derived from (aminophenoxy)-salicyclic acid esters are preferred used. These monomers are a further object of the present invention and are demonstrated by the general formula

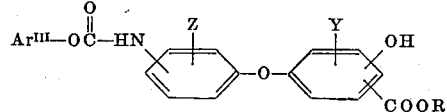

in which
R and $Ar'''$ is just as defined above and Z and Y, the same or different, are selected from the group consisting of a hydrogen atom, chlorine and bromine.
Starting compounds for these aminophenoxy salicyclic acid esters are the corresponding nitrophenoxy salicyclic acid compounds of the kind described, for example, in German Offenlegungsschrift No. 1,902,929.

Thus they are produced by reducing nitro compounds to amino compounds by conventional methods, acylating and esterifying the amino compounds with anhydrides, carboxylic acid chlorides and with chlorocarbonic acid esters.

Polycondensation into high molecular weight polybenz-1,3-oxazin-(2,4)-diones can be carried out either in the presence or absence of a solvent. Polycondensation is preferably carried out in an aprotic, highly polar solvent, for example N,N-dimethyl formamide, N,N-dimethyl acetamide, N,N'-tetramethyl urea, N,N'-hexamethyl phosphoric acid triamide, tetramethylene sulphone, diphenyl sulphoxide or dimethyl sulphoxide. The aprotic highly polar solvents can also be used in admixture with one another or in conjunction with other aprotic, less polar solvents for example, benzene, toluene, chlorobenzene, methylene chloride, carbon tetrachloride or dioxan. Dimethyl sulphoxide, in which polycondensation takes place smoothly and quickly, represents the preferred solvent.

The solvent used and the monomeric starting components have to be pure, in particular they should contain hardly any water because otherwise the polybenz-1,3-oxazin-(2,4)-diones obtained reach only a low molecular weight. Accordingly, the reaction also has to be carried out in an inert atmosphere, for example dry nitrogen.

Polycondensation can be carried out at temperatures in the range of from 20° to 200°C, the preferred temperature ranges being from 80° to 120°C.

Polycondensation can be accelerated by the catalytic effect of organic tertiary amines for example, triethylamine, tripropylamine, pyridine, N,N-dimethyl aniline, quinoline, N-methyl morpholine, 1,4-diaza bicyclo [2.2.2] octane, 1,3-diaza-adamantane. The catalytically active amine is used in a concentration of from 0.01 to 2 %, preferably in a concentration of from 0.05 to 0.3 %.

Since, in many cases, the polybenz-1,3-oxazin-(2,4)-diones are soluble in the reaction medium, the progress of the polycondensation reaction can be followed from the increase in viscosity. The reaction is substantially complete when there is no sign of any further increase in viscosity.

The polycondensation mixture can be worked up in different ways. For example, the reaction mixture can be processed, for example into films, filaments and coatings, directly, i.e., without further isolation of the polybenz-1,3-oxazin-(2,4)-dione. If it is desired to isolate the polybenz-1,3-oxazin-(2,4)-diones before processing, they are best precipitated from the reaction mixture. Precipitants that are miscible with the reaction solvent represent suitable precipitants. Chlorobenzene, methylene chloride and carbon tetrachloride are examples of particularly suitable precipitants. In some cases, the polybenz-1,3-oxazin-(2,4)-dione actually precipitates from the reaction solvent on its own, i.e., without any need to add precipitants, so that it can be isolated simply by filtration.

In a typical procedure for preparing the polybenz-1,3-oxazin-(2,4)-diones, the N-(aroxycarbonyl)-amino-o-hydroxy aryl carboxylic acid ester is dissolved in substantially anhydrous dimethyl sulphoxide, 1,4-diazabicyclo [2.2.2] octane is added as catalyst and the mixture is heated to 100° – 110°C until the viscosity reaches its maximum and further processing is carried out as just described. The resulting polybenz-1,3-oxazin-(2,4)-diones are generally infusible polymers which are insoluble in most solvents. Several of them are soluble in highly polar solvents for example sulphuric acid, m-cresol, dimethyl formamide, dimethyl acetamide, dimethyl sulphoxide, N-methyl pyrrolidone and tetramethylene sulphone. Accordingly, they can be processed from solutions in solvents such as these into shaped articles such as films, filaments and coatings. The shaped articles produced in this way show excellent resistance at elevated temperatures in air, even over prolonged periods. Accordingly, the shaped articles can be used for any applications where elevated temperatures occur both for short periods and also for prolonged periods.

EXAMPLE 1 a. 5-(4-nitrophenoxy)-salicylic acid 77 g of 2,5-dihydroxy benzoic acid and 78.5 g of p-chloronitrobenzene were dissolved in 300 ml of dimethyl sulphoxide under a nitrogen atmosphere, and 40 g of sodium hydroxide and 225 ml of benzene were added to the resulting solution. The mixture was then distilled under reflux at 90° to 95°C on a water separator until no more water separated off (approximately 2 hours). The benzene was distilled off in a water jet vacuum, the residue poured into 2.5 litres of water, the mixture acidified with concentrated hydrochloric acid while stirring vigorously, the crude, light brown 5-(4-nitrophenoxy)-salicylic acid which was precipitated was filtered off under suction and washed acid free with water. Drying in vacuo at 80°C gave 126 g (92 % of the theoretical) of 5-(4-nitrophenoxy)-salicylic acid, recrystallised from methanol (and active carbon, optionally with small quantities of water added) 120 g (87 % of the theoretical yield) of yellow crystals melting at 193° to 194°C.

b. 5-(4-nitrophenoxy)-salicylic acid phenyl ester 220 g of 5-(4-nitrophenoxy)-salicylic acid and 21.9 g of imidazole were added at 75°C to a mixture, melted under nitrogen, of 343 g of diphenyl carbonate and 220 g of phenol; the mixture was stirred at 150°C until no more carbon dioxide was evolved (about 1 hour), 2 litres of ether were added to the solution after it had been cooled to room temperature in order to precipitate the phenyl ester formed, the phenyl ester formed was filtered off under suction, washed with ether and dried in vacuo at 80°C. Yield: 215 g (77 % of the theoretical yield) of m.p. 123° – 127°C, and of m.p. 130° – 130.5°C after recrystallisation from benzene/gasoline.

Analysis: $C_{19}H_{13}NO_6$ (351.30)

| | | | |
|---|---|---|---|
| calculated: | 65.0 % C | 3.73 % H | 3.99 % N |
| found: | 64.9 % C | 3.71 % H | 4.02 % N | c. 5-(4-aminophenoxy)-salicylic acid phenyl ester 515 g of 5-(4-nitrophenoxy)-salicylic acid phenyl ester were dissolved in 1.5 litres of dioxan and the resulting solution was hydrogenated in an autoclave at 55° to 75°C under a hydrogen pressure of 150 to 180 atms following the addition of 10.3 g of palladium carbon (containing 5 % of palladium). Hydrogenation took 2 hours. After the catalyst had been separated off, hydrogen chloride was introduced into the filtrate until it was saturated, resulting in precipitation of the hydrochloride of 5-(4-aminophenoxy)-salicylic acid phenyl ester which was filtered off under suction, washed with dioxan and dried in vacuo at 70°C.

Yield: 438 g (84 % of the theoretical yield) of hydrochloride. Recrystallization of the hydrochloride from ethanol/water gave the free 5-(4-aminophenoxy)-salicylic acid phenyl ester in the form of small colourless needles melting at 119°C.

Analysis: $C_{19}H_{15}NO_4$ (321.32)

| | | | |
|---|---|---|---|
| calculated: | 71.0 % C | 4.71 % H | 4.36 % N |
| found: | 70.9 % C | 4.73 % H | 4.68 % N | d. 5-[4-(phenoxycarbonyl amino)-phenoxy]-salicylic acid phenyl ester 11.6 g of sodium carbonate were added to a suspension of 35.8 g of the hydrochloride of 5-(4-aminophenoxy)-salicylic acid phenyl ester in 500 ml of water, and a solution of 15.6 g of chloroform acid phenyl ester in 200 ml of benzene was added dropwise with vigorous stirring over a period of 1 hour at 25°C. Stirring was then continued at this temperature for another 2 to 3 hours. The 5-[4-(phenoxycarbonyl amino)-phenoxy]-salicylic acid phenyl ester was initially separated off in the form of a heavy paste, part of which was dissolved by the benzene. The 5-[4-(phenoxycarbonyl amino)-phenoxy]-salicylic acid phenyl ester deposited was filtered off under suction, washed with benzene and dried in vacuo. More of the 5-[4-(phenoxycarbonyl amino)-phenoxy]-salicylic acid phenyl ester could be obtained by evaporation from the benzene solution.

Total yield: 42.3 g (96 % of the theoretical yield) of m.p. 134° – 136°C, m.p. after recrystallisation from benzene/ligroin: 139°C.

Analysis: $C_{26}H_{19}O_6$ (441.42)

| | | | |
|---|---|---|---|
| calculated: | 70.7 % C | 4.34 % H | 3.17 % N |
| found: | 70.7 % C | 4.16 % H | 2.87 % N | e. Polybenzoxazindione of 5-[4-(phenoxycarbonyl amino)-phenoxy]-salicylic acid phenyl ester 22.07 g of 5-[4-(phenoxycarbonyl amino)-phenoxy]-salicylic acid phenyl ester were dissolved in 140 ml of anhydrous dimethyl sulphoxide, the resulting solution was heated to 80°C, 40 mg of 1,4-diaza bicyclo [2.2.2] octane were added and the mixture further heated to 100°C. The solution which initially turned viscous was stirred for about 2 hours at 100°C. The polybenzoxazindione formed was precipitated from the solution during the reaction, being filtered off under suction after cooling, washed with methylene chloride and dried in vacuo at 120°C. Polybenz-1,3-oxazin-(2,4)-dione having a relative viscosity of 1.29 (1 g in 100 ml of sulphuric acid solution) at 25°C, was obtained in a yield of 12 g (95 % of the theoretical yield).

EXAMPLE 2 a. 4-(4-nitrophenoxy)-salicylic acid was prepared as described in Example 1a from p-chloronitrobenzene and 2,4-dihydroxybenzoic acid.

Yield: 63.5 % of the theoretical yield, m.p. 193° – 195°C (from methanol)

Analysis: $C_{13}H_9NO_6$ (275.21)

| | | | |
|---|---|---|---|
| calculated: | 56.7 % C | 3.30 % H | 5.09 % N |
| found: | 56.7 % C | 3.27 % H | 4.93 % N | b. 4-(4-nitrophenoxy)-salicylic acid phenyl ester was obtained in accordance with Example 1b by esterifying 4-(4-nitrophenoxy)-salicylic acid with diphenyl carbonate.

Yield: 60 % of the theoretical yield, m.p. 118° – 119°C (from benzene/gasoline)

Analysis: $C_{19}H_{13}NO_6$ (351.30)

| | | | |
|---|---|---|---|
| calculated: | 65.0 % C | 3.73 % H | 3.99 % N |
| found: | 65.0 % C | 3.69 % H | 3.90 % N | c. 4-(4-aminophenoxy)-salicylic acid phenyl ester was obtained in accordance with Example 1c by hydrogenating 4-(4-nitrophenoxy)-salicylic acid phenyl ester.

Yield: quantitiative in hydrochloride form; m.p. of the free amino ester 121°C (from ethanol/water).

Analysis: $C_{19}H_{15}NO_4$ (321.32)

| | | | |
|---|---|---|---|
| calculated: | 71.0 % C | 4.71 % H | 4.36 % N |
| found: | 70.5 % C | 4.61 % H | 4.33 % N | d. 4-[4-(phenoxycarbonylamino)-phenoxy]-salicylic acid phenyl ester was obtained in accordance with Example 1d by reacting 4-(4-aminophenoxy)-salicylic acid phenyl ester with chloroformic acid phenyl ester.

Yield: 94 % of the theoretical yield, m.p. 178.5° – 180°C (from acetone)

Analysis: $C_{26}H_{19}NO_6$ (441.42)

| | | | |
|---|---|---|---|
| calculated: | 70.7 % C | 4.34 % H | 3.17 % N |
| found: | 70.3 % C | 4.24 % H | 3.31 % N | e. Polybenzoxazindione of 4-[4-(phenoxycarbonyl amino)-phenoxy]-salicylic acid phenyl ester was prepared in accordance with Example 1e. The polybenz-1,3-oxazin-(2,4)-dione had a viscosity of 1.18 (1 g in 100 ml of sulphuric acid solution).

f. 20 g of the polybenzoxazindione prepared in accordance with e) were dissolved in 100 g of m-cresol and applied to a glass plate by means of a casting slide. The solvent was then removed at 120°C in a recirculating-air drying cabinet until a tough, solid and transparent film remained. This film was resistant to heating in air up to temperatures of 350°C.

EXAMPLE 3

Polybenz-1,3-oxazin-(2,4)-dione of 4-(phenoxycarbonyl amino)-salicylic acid phenyl ester 10 g of 4-(phenoxy carbonyl amino)-salicylic acid phenyl ester were dissolved in 30 ml of anhydrous dimethyl sulphoxide and, following the addition of 100 mg of 1,4-diaza bicyclo [2.2.2] octane, the resulting solution was heated first for 1 hour to 100°C and then for 2 hours to 120°C. The polybenz-1,3-oxazin-(2,4)-dione formed was precipitated from the solution, filtered off under suction after cooling and washed with methylene chloride. Polybenz-1,3-oxazin-(2,4)-dione having a relative viscosity of 1.16 (1 g in 100 ml of sulphuric acid solution) was obtained after drying in a yield of 4.6 g (100 % of the theoretical yield).

I claim:
1. Polybenz-1,3-oxazin-(2,4)-diones having a molecular weight of 5,000 to 100,000 and consisting essentially of a recurring structural unit corresponding to the following general formula:

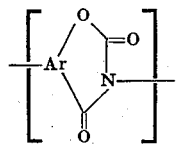

in which
Ar is selected from the group consisting of

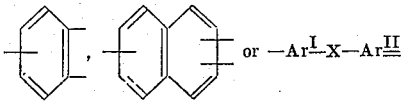

and the two-linkages attaching the oxygen and the carbonyl group to Ar are in the o-position relative to one another,
- $Ar^I$ represents a bivalent $C_6 - C_{10}$ aromatic radical, which is unsubstituted or substituted by chlorine or bromine
- $Ar^{II}$ represents a trivalent $C_6 - C_{10}$ aromatic radical; and
- X represents a radical selected from the group consisting of —O—, —S—, —SO$_2$—, —CH$_2$— and —CO—.

2. Polybenz-1,3-oxazin-(2,4)-diones as claimed in claim 1, in which Ar is

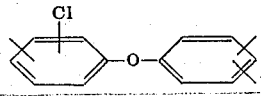

3. Polybenz-1,3-oxazin-(2,4)-diones as claimed in claim 1, in which Ar is

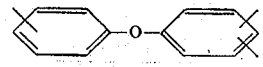

4. A process for the production of polybenz-1,3-oxazin-(2,4)-diones by polycondensing in an inert atmosphere AB-monomers at temperatures of from 20° to 200°C, wherein said AB-monomers are N-(aroxycarbonyl)-amino-o-hydroxy aryl carboxylic acid esters corresponding to the general formula

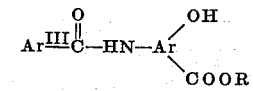

in which
- $Ar'''$ represents a monovalent $C_6 - C_{10}$ aromatic radical,
- R represents a radical selected from the group consisting of a $C_1$ to $C_4$ alkyl radical, a $C_7$ to $C_{10}$ aralkyl radical and $Ar'''$, and
- Ar is as defined in claim 1.

5. A process as claimed in claim 4, wherein polycondensation is carried out in the presence of an aprotic, highly polar solvent.

6. A process as claimed in claim 5, wherein the solvent is dimethyl sulphoxide.

7. A process as claimed in claim 4, wherein polycondensation is carried out in the presence of an organic tertiary amine as catalyst.

8. A process as claimed in claim 4, wherein the condensation takes place at a temperature of from 80° to 120°C.

9. A process as claimed in claim 4, wherein the condensation takes place in an inert atmosphere.

10. A process as claimed in claim 9, wherein the condensation takes place in an atmosphere of nitrogen.

* * * * *